United States Patent [19]

DeShazo, Jr.

[11] 3,747,060
[45] July 17, 1973

[54] SIGNAL GENERATING AND RECORDING APPARATUS WITH TIME DELAY

[75] Inventor: Earl L. DeShazo, Jr., Bartlesville, Okla.

[73] Assignee: Phillips Petroleum Company, Bartlesville, Okla.

[22] Filed: Sept. 14, 1970

[21] Appl. No.: 72,026

[52] U.S. Cl. ......... 340/18 P, 181/0.5 BE, 324/188, 340/179, 340/182, 346/33 WL
[51] Int. Cl. ........ G01v 1/40, G01d 9/10, G04f 3/06
[58] Field of Search .............. 340/18 P, 179, 182, 340/183, 346; 181/0.5 BE; 325/3, 6; 324/1, 188; 346/33 WL; 343/103; 317/80

[56] References Cited
UNITED STATES PATENTS

| | | | |
|---|---|---|---|
| 3,079,601 | 2/1963 | Carter et al. | 324/188 |
| 3,447,127 | 5/1969 | Wiley | 181/0.5 FS |
| 3,488,658 | 1/1970 | Tanguy | 346/33 WL |
| 3,488,661 | 1/1970 | Tanguy | 346/33 WL |
| 3,093,811 | 6/1963 | Schneider | 181/0.5 FS |
| 3,304,537 | 2/1967 | Schwartz | 181/0.5 FS |

Primary Examiner—Benjamin A. Borchelt
Assistant Examiner—H. A. Birmiel
Attorney—Young and Quigg

[57] ABSTRACT

Two signal generators, such as sonic logging transmitters, are actuated sequentially by a circuit which includes an oscillator and a pulse generator. The delay between the actuations is established by a comparison circuit which compares counts registered on a counter with a preset count. Circuit means are also provided for converting received analog signals to digital form and recording the digital signals.

8 Claims, 3 Drawing Figures

INVENTOR.
E. L. DE SHAZO, JR.

BY Young + Quigg

ATTORNEYS

SIGNAL GENERATING AND RECORDING APPARATUS WITH TIME DELAY

Various types of logging equipment have been developed for use in measuring properties of formations intersected by well bores. In U.S. Pat. No. 3,447,127 there is disclosed apparatus which is adapted to measure the velocity of propagation of acoustical signals through surrounding formations. This is accomplished by suspending in a well a logging tool which has a pair of acoustical signal transmitters mounted thereon in spaced relationship and a receiver spaced from the transmitters. The time of travel of sound waves for each transmitter to the receiver is measured to provide an indication of the velocity transmitting properties of the surrounding formations.

In most well logging operations of this type it is desirable to actuate the transmitters periodically as the logging tool is moved through the well. The detected signals are recorded each time one of the transmitters is energized. It is necessary to delay the actuation of the second transmitter by a sufficient time interval to permit sound waves from the first transmitter to die out. It is often desirable to record the output signal from the detector in digital form for ease in storage and subsequent manipulation. This can pose problems because analog-to-digital converting equipment is generally not available to record continuously the high frequency signals detected in such an acoustical logging operation.

In accordance with this invention, improved apparatus is provided for actuating two signal transmitters periodically at predetermined time intervals. Apparatus is also provided for recording in digital form the output signal from a receiver at selected time intervals after each transmitter is actuated.

In the accompanying drawing

Figure 1:
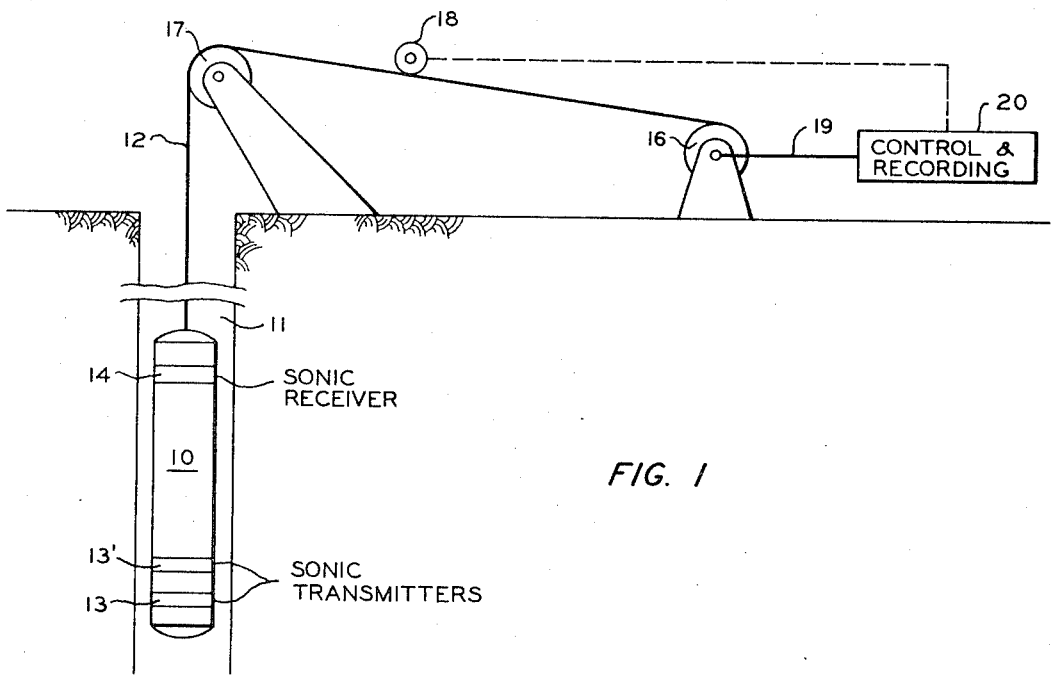
FIG. 1 is a schematic representation of acoustical signal logging equipment which can be controlled by the apparatus of this invention.

Referring now to the drawing in detail and to FIG. 1 in particular, there is shown an elongated housing 10 which is suspended within a well bore 11 by means of a cable 12. Two sonic transmitters 13 and 13' and a receiver 14 are mounted on housing 10 in spaced relationship with one another. Acoustical signals generated by the transmitters travel outwardly through the well bore into the surrounding earth formations and through these formations to receiver 14. The time of transmission of each such signal provides an indication of the velocity of transmission through the surrounding formations, and thus an indication of the density of these formations.

The upper end of cable 12 is secured at the surface to a reel 16 which serves to raise and lower housing 10 in the well bore. Reel 16 normally is driven by a suitable motor, not shown. Cable 12 extends from reel 16 over a pulley 17, and an odometer 18 engages the cable to provide a measurement of the depth to which housing 10 is lowered. The end of cable 12 engages suitable commutator segments on the shaft which supports reel 16 so that the end of cable 12 can be connected by leads 19 to control and recording equipment 20. Cable 12 contains a suitable number of electrical leads to actuate the sonic transmitters and to transmit received signals to equipment 20.

Figure 2:
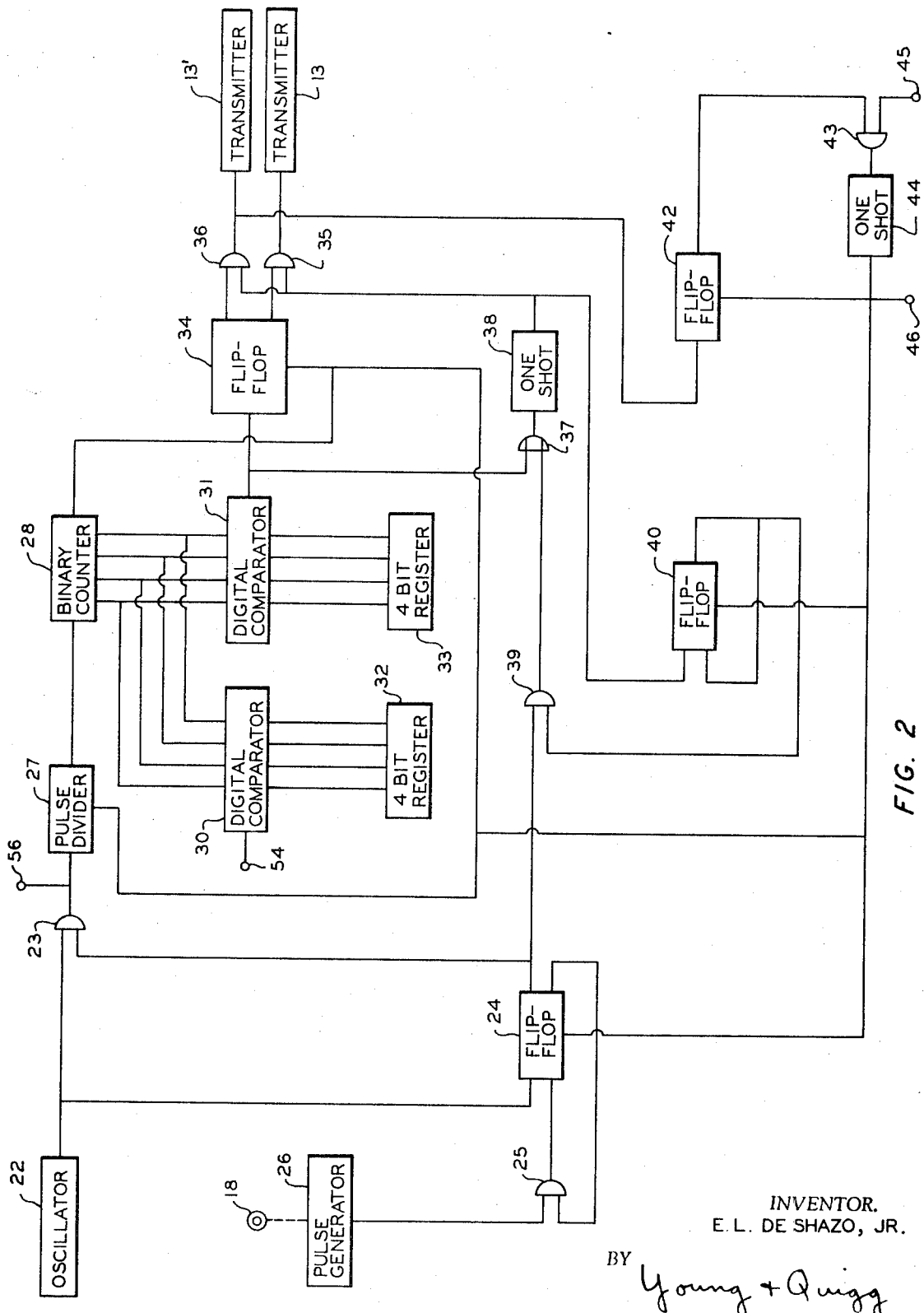
FIG. 2 is a schematic circuit drawing of the apparatus of this invention which is employed to energize two transmitters sequentially.

The control apparatus of this invention is illustrated in FIG. 2. The output signal from an oscillator 22 is applied to an AND circuit 23 and to the first input of a flip-flop circuit 24, which can be a type D flip-flop. In one specific embodiment of this invention, oscillator 22 provides an output signal of two megacycles per second, for example. Odometer 18 is connected to a pulse generator 26 to establish a pulse each time the cable is lowered a predetermined distance into the well, such as one foot, for example. The output signal from generator 26 is applied to an AND circuit 25. The output of circuit 25 is connected to the second input of flip-flop 24. The second output of flip-flop 24 is connected to the first input of AND circuit 25. The first output of flip-flop 24 is connected to the second input of AND circuit 23. The output of AND circuit 23 is applied to the input of a pulse divider 27. This pulse divider can be a counter which provides an output pulse each time a given number of input pulses is received. In the specific embodiment mentioned above, divider 27 can be selected so that an output pulse is established at approximately 5 millisecond intervals. These pulses are applied to a binary counter 28.

The output of binary counter 28 is applied to first and second digital comparators 30 and 31. These comparators can be 2-bit comparators of the type described in Data Sheet DM7200/DM8200 of National Semiconductors Corporation, Santa Clara, Calif., Sept. 1968, for example. Reference signals from two 4-bit registers 32 and 33 are also applied to respective comparators 30 and 31. The output of comparator 31 is applied to the input of a flip-flop circuit 34, which can be a type J-K flip-flop. The two outputs of flip-flop 34 are applied through respective AND circuits 35 and 36 to respective transmitters 13 and 13'. The output of comparator 31 is also applied through an OR circuit 37 and a one-shot multivibrator 38 to the second inputs of AND circuits 35 and 36. The first output of flip-flop 24 is applied through an AND circuit 39 to second input of OR circuit 37. The output of one-shot multivibrator 38 is applied to the first input of a flip-flop circuit 40, which can be a type D flip-flop. The output of this circuit is applied to the second input thereof and to the second input of AND circuit 39.

The output of AND circuit 36 is applied to the input of a flip-flop circuit 42, which can be a type D flip-flop. The output of flip-flop 42 is applied through an AND circuit 43 to the input of a second one-shot multivibrator 44. The second input to AND circuit 43 is obtained from a terminal 45 which is described hereinafter in conjunction with FIG. 3. The output of one-shot multivibrator 44 provides reset signals to pulse divider 27, binary counter 28 and flip-flops 24, 34, 40 and 42. This reset signal is also applied to a terminal 46.

At the beginning of each cycle of operation a pulse is applied to AND circuit 25 from pulse generator 26. When the next following pulse is received by flip-flop 24 from oscillator 22, an output pulse is applied to AND circuit 23 to open the gate. This permits pulses from oscillator 22 to be transmitted to divider 27. Divider 27 transmits a series of pulses to binary counter 28, which pulses are approximately five milliseconds apart. The output signal from flip-flop 24 is also transmitted through AND circuit 39, OR circuit 37 and multivibrator 38 to AND circuits 35 and 36. Flip-flop 34 initially is in a position such that a signal is established at the second output which is connected to AND circuit 35. This results in the immediate transmission of a pulse to transmitter 13 when a pulse is established by generator 26, thereby resulting in the generation of a first acoustical signal.

The circuit of FIG. 2 is designed so that transmitter 13' is energized at a predetermined time interval following the time that transmitter 13 is energized. This time interval is established by the reference signal loaded into 4-bit register 33. Such reference signal can be any desired multiple of five milliseconds up to 80 milliseconds. Counter 28 serves to count the pulses from divider 27 and to transmit a corresponding signal to comparator 31. When the transmitted signal is equal to the predetermined signal established by register 33, an output signal is transmitted from comparator 31 to flip-flop 34. This serves to transmit a pulse to gate circuit 36 which energizes transmitter 13'. At the same time, a signal is transmitted through flip-flop 42 and multivibrator 46 to establish a reset signal which resets the apparatus in anticipation of a second signal from generator 26.

Figure 3:
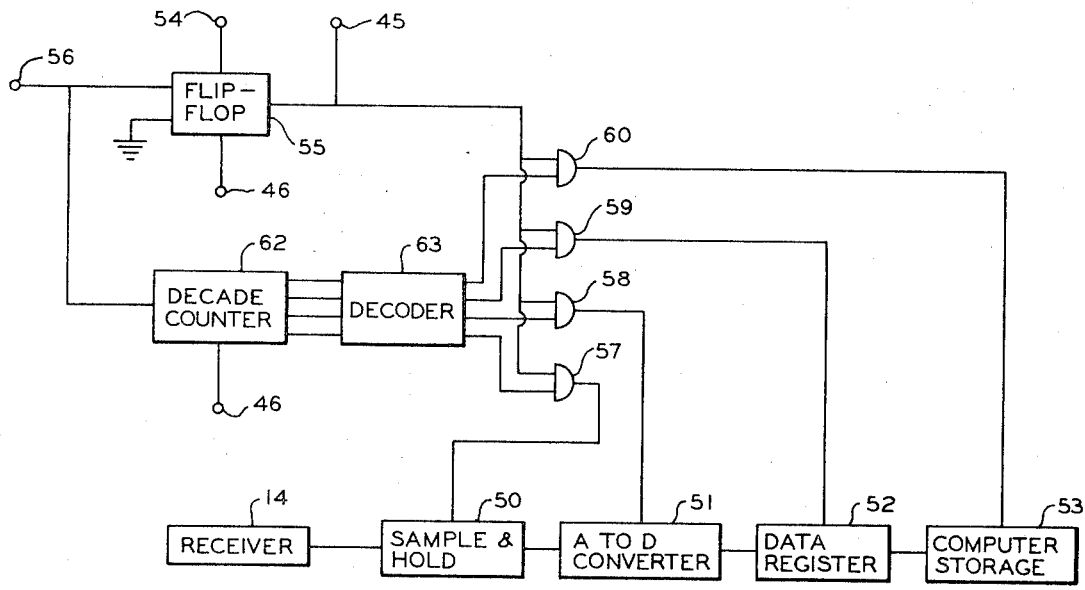
FIG. 3 is a schematic circuit drawing of the apparatus employed to control the recording of signals from the receiver.

The apparatus illustrated in FIG. 3 is employed to control the recording of signals from receiver 14. The output signal from receiver 14 is transmitted through a sample-and-hold circuit 50 to an analog-to-digital converter 51. The output from converter 51 is transmitted to a data register 52, the output of which is transmitted to a signal storage means 53 which can be the memory core of a digital computer. The circuit thus far described in FIG. 3 is controlled by an output signal from digital comaparator 30 of FIG. 2. This output signal is applied to a terminal 54 which is connected to the set point of a flip-flop circuit 55, which can be a type D flip-flop. The reference signal established by a 4-bit register 32 is also a multiple of five milliseconds and is selected to provide the desired time at which the output signal from receiver 14 is to be recorded. This time, which can be varied by the setting of register 32, is selected to provide a recording of the signal received from the acoustical transmitter at a selected time interval after the signal is generated. This time can occur after signals are received which travel directly through well bore 11. The first input to flip-flop 55 of FIG. 3 is received from a terminal 56 which is connected to the output of AND circuit 23 of FIG. 2. This assures that the flip-flop is energized at the time a pulse is transmitted by circuit 23. The second input of flip-flop 55 is connected to ground. The output of flip-flop 55 is connected to four AND circuits 57, 58, 59 and 60. The outputs of these AND circuits are connected to sample-and-hold circuit 50, analog-to-digital converter 51, data register 52, and storage means 53, respectively. Terminal 56 is also connected to the input of a decade counter 62. The output of this counter is connected to a decoder 63, the outputs of which are connected to respective circuits 57, 58, 59 and 60.

When an output signal is established by digital comparator 54 of FIG. 2, flip-flop 55 is set to apply signals to the four AND circuits of FIG. 3. These circuits are pulsed sequentially by the output of decoder 63 so that sample-and-hold circuit 50 is first actuated to sample a predetermined portion of the output analog signal from receiver 14. Gate 58 then actuates analog-to-digital converter 51 to convert the sampled signal into digital form. Data register 52 is then actuated to receive the converted signal, and finally this signal is transmitted to storage means 53. The use of a high speed analog-to-digital converter permits an accurate representation to be made in digital form of the output signal from receiver 14. After a number of signals have been stored in the computer, these signals can be reproduced in sequence and recorded on a magnetic tape for subsequent processing, for example.

While this invention has been described in conjunction with a presently preferred embodiment, it obviously is not limited thereto.

What is claimed is:
1. Signal generating apparatus comprising:
first and second signal transmitters;
an oscillator to establish a series of first pulses at a preselected frequency;
a pulse generator to establish actuating pulses;
means responsive to the output of said pulse generator to energize said first transmitter when an actuating pulse is established comprising a flip-flop circuit, means to apply the output of said pulse generator to one input of said flip-flop circuit, and means to apply the output of said oscillator to the second input of said flip-flop circuit, whereby an output signal is applied from said flip-flop to said first transmitter when a pulse is received by said flip-flop from said oscillator after a pulse is received by said flip-flop from said pulse generator;
a pulse counter;
means responsive to the output of said pulse generator to apply the output of said oscillator to said counter when an actuating pulse is established;
a signal register to establish a reference signal representative of a predetermined number of counts;
signal comparator means to compare the counts received by said counter with said reference signal and to establish a control signal when said compared counts are equal; and
means to apply said control signal to said second transmitter to energize said second transmitter.

2. Signal generating apparatus comprising:
first and second signal transmitters;
an oscillator to establish a series of first pulses at a preselected frequency;
a pulse generator to establish actuating pulses;
means responsive to the output of said pulse generator to energize said first transmitter when an actuating pulse is established;
a pulse counter;
means responsive to the output of said pulse generator to apply the output of said oscillator to said counter when an actuating pulse is established;
a signal register to establish a reference signal representative of a predetermined number of counts;
signal comparator means to compare the counts received by said counter with said reference signal and to establish a control signal when said compared counts are equal;
means to apply said control signal to said second transmitter to energize said second transmitter; and
means responsive to said second transmitter being energized to reset the means which energize said transmitters in response to signals from said pulse generator and said oscillator.

3. The apparatus of claim 2 wherein said pulse counter is a binary counter, said signal register is a 4-bit register, and said comparator means is a digital comparator.

4. The apparatus of claim 2, further comprising a pulse dividing means connected between said oscillator and said pulse counter.

5. Signal generating and recording apparatus comprising:
first and second signal transmitters;
an oscillator to establish a series of first pulses at a preselected frequency;
a pulse generator to establish actuating pulses;
means responsive to the output of said pulse generator to energize said first transmitter when an actuating pulse is established;
a pulse counter;
means responsive to the output of said pulse generator to apply the output of said oscillator to said counter when an actuating pulse is established;
a signal register to establish a reference signal representative of a predetermined number of counts;
signal comparator means to compare the counts received by said counter with said reference signal and to establish a control signal when said compared counts are equal;
means to apply said control signal to said second transmitter to energize said second transmitter; and
apparatus to record signals received from a signal receiver after said transmitters are energized comprising signal receiving and recording means, control means to actuate said signal receiving and recording means and means responsive to said pulse generator and said oscillator to actuate said control means at predetermined times after said transmitters are energized.

6. The apparatus of claim 5 wherein said means to actuate comprises a second signal register to establish a second reference signal representative of a predetermined number of counts, second signal comparator means to compare the counts received by said counter with said second reference signal and to establish a second control signal when the counts received by said counter are equal to said second reference signal, and means to apply said second control signal to said means to said control means.

7. The apparatus of claim 6 wherein said signal receiving and recording means comprises a sample-and-hold circuit, an analog-to-digital converter having the input thereof connected to the output of said sample-and-hold circuit, a data register having the input thereof connected to the output of said converter, and storage means connected to the output of said data register.

8. The apparatus of claim 7 wherein said means to apply said second control signal comprises a decade counter, and a decoder having the input thereof connected to the output of said decade counter, the outputs of said decade counter actuating said sample-and-hold circuit, said analog-to-digital converter, said data register, and said storage means.

* * * * *